United States Patent
Yamate

(10) Patent No.: US 7,719,486 B2
(45) Date of Patent: May 18, 2010

(54) PLASMA DISPLAY DEVICE

(75) Inventor: Kazunori Yamate, Osaka (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 11/569,512

(22) PCT Filed: May 30, 2005

(86) PCT No.: PCT/JP2005/009886

§ 371 (c)(1),
(2), (4) Date: Nov. 22, 2006

(87) PCT Pub. No.: WO2005/117486

PCT Pub. Date: Dec. 8, 2005

(65) Prior Publication Data

US 2007/0222902 A1    Sep. 27, 2007

(30) Foreign Application Priority Data

May 31, 2004    (JP)    .............................. 2004-161008

(51) Int. Cl.
*G09G 3/28* (2006.01)

(52) U.S. Cl. .............................. 345/60; 345/67; 345/68; 345/212; 345/213; 315/169.1; 315/169.2; 315/169.3; 315/169.4

(58) Field of Classification Search ............. 345/60–68, 345/212, 213; 315/169.1–169.4
See application file for complete search history.

(56) References Cited

U.S. PATENT DOCUMENTS

| 5,491,452 A | 2/1996 | Ohtsubo et al. |
| 5,869,892 A | 2/1999 | Ohtsubo et al. |
| 5,971,566 A | 10/1999 | Tani et al. |
| 6,144,349 A | 11/2000 | Awata et al. |
| 6,275,203 B1 | 8/2001 | Yamada |
| 6,320,326 B1 * | 11/2001 | Shino et al. ............... 315/169.4 |
| 6,388,678 B1 | 5/2002 | Kasahara et al. |
| 6,542,135 B1 | 4/2003 | Kasahara et al. |

(Continued)

FOREIGN PATENT DOCUMENTS

EP    0821385    1/1998

(Continued)

OTHER PUBLICATIONS

English Language Abstract of JP-10-240138, Sep. 11, 1998.

(Continued)

*Primary Examiner*—Henry N Tran
*Assistant Examiner*—Viet Pham
(74) *Attorney, Agent, or Firm*—Greenblum & Bernstein, P.L.C.

(57) ABSTRACT

A voice circuit is arranged on a chassis member. The voice circuit comprises a voice output amplifier and a high-frequency bypass unit. An output terminal of the voice output amplifier is connected to one end of a voice coil in a speaker through an interconnection, and is grounded through a high-frequency bypass unit. The voice output amplifier supplies a voice current to the voice coil through an interconnection. The resonance frequency of the high-frequency bypass unit is set to the same frequency as that of a discharge current flowing in the chassis member. A high-frequency induced current generated in the voice circuit due to the discharge current flowing in the chassis member flows to a ground terminal through the high-frequency bypass unit.

10 Claims, 14 Drawing Sheets

U.S. PATENT DOCUMENTS

| | | | |
|---|---|---|---|
| 7,391,389 B1 * | 6/2008 | Kawada et al. | 345/60 |
| 2003/0134612 A1 | 7/2003 | Nakayama et al. | |
| 2004/0222747 A1 * | 11/2004 | Onozawa et al. | 315/169.1 |

FOREIGN PATENT DOCUMENTS

| | | |
|---|---|---|
| JP | 5-283752 | 10/1993 |
| JP | 8149590 | 6/1996 |
| JP | 2807672 | 7/1998 |
| JP | 11-038931 | 2/1999 |
| JP | 11-085098 | 3/1999 |
| JP | 11-275270 | 10/1999 |
| JP | 11341579 | 12/1999 |
| JP | 2000-184491 | 6/2000 |
| JP | 3074649 | 1/2001 |
| JP | 2001-045162 | 2/2001 |
| JP | 2001-275358 | 10/2001 |
| JP | 2003-259247 | 9/2003 |
| JP | 2004-029851 | 1/2004 |
| JP | 2004-120795 | 4/2004 |
| WO | 01/67470 | 9/2001 |

OTHER PUBLICATIONS

English Language Abstract of JP-8-149590, Jun. 7, 1996.
English Language Abstract of JP-11-341579, Dec. 10, 1999.
English Language Abstract of JP-2000-184491, Jun. 30, 2009.
English Language Abstract of JP-2004-120795, Apr. 15, 2004.

* cited by examiner

F I G. 1 3
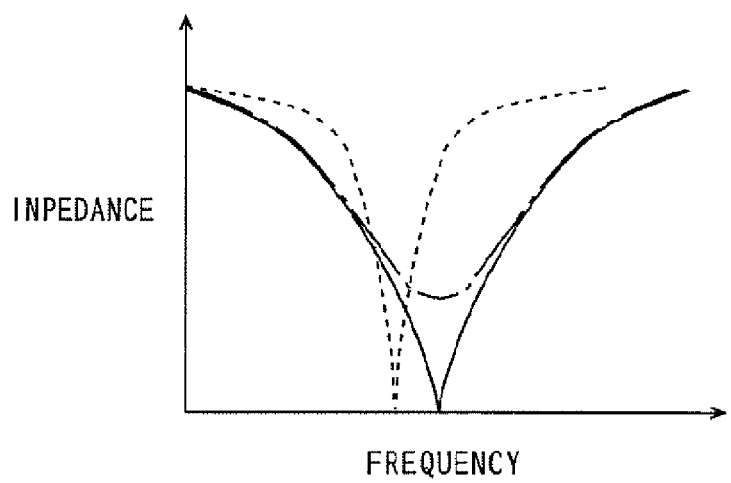
F I G. 1 4
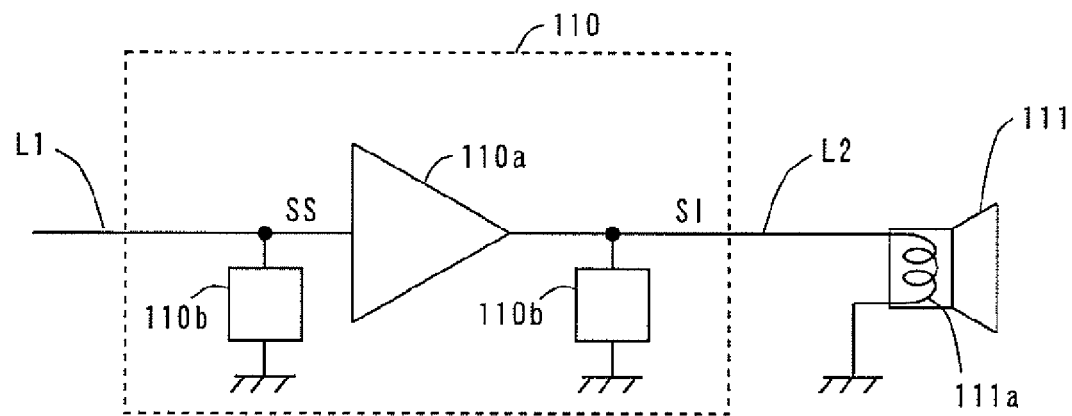

PLASMA DISPLAY DEVICE

TECHNICAL FIELD

The present invention relates to a plasma display device comprising a voice circuit.

BACKGROUND ART

Plasma display devices using plasma display panels (hereinafter abbreviated as PDPs) serving as self-emission video displays have the advantages that thinning and larger screens are possible. In the plasma display devices, videos are displayed by utilizing light emission in discharging discharge cells composing pixels.

In the plasma display device, the PDP comprising electrodes on a pair of transparent glass substrates, a chassis member for holding the PDP, and a display driving circuit block mounted on the chassis member constitute a PDP module (see Patent Document 1, for example).

FIG. 15 is a perspective view showing a part of a conventional AC-type PDP. FIG. 16 is a cross-sectional view taken along a line A-A shown in FIG. 15, and FIG. 17 is a cross-sectional view taken along a line B-B shown in FIG. 15.

As shown in FIGS. 15 to 17, a plurality of display electrodes 4 each comprising a scanning electrode SCN and a sustain electrode SUS are formed in a stripe shape on a first glass substrate 1. A light-shielding layer 5 is formed between the adjacent display electrodes 4. A dielectric layer 6 is formed so as to cover the scanning electrode SCN, the sustain electrode SUS, and the light-shielding layer 5 on the first glass substrate 1, and a protective film 7 is further formed on the dielectric layer 6.

The scanning electrode SCN comprises a transparent electrode 2a (see FIG. 16), and a bus 2b (see FIG. 16) composed of silver or the like electrically connected to the transparent electrode 2a. The sustain electrode SUS comprises a transparent electrode 3a (see FIG. 16), and a bus 3b (see FIG. 16) composed of silver or the like electrically connected to the transparent electrode 3a.

A plurality of data electrodes D, which are covered with an insulating layer 9, are formed in a stripe shape on a second glass substrate 8. Bulkheads 11 are formed parallel to the data electrodes D on the insulating layer 9 between the data electrodes D. Red, green, and blue fluorescent layers 12 are formed so as to cover a surface of the insulating layer 9 and side surfaces of the bulkheads 11.

The first glass substrate 1 and the second glass substrate 8 are arranged opposite to each other such that the display electrode 4 and the data electrode D are perpendicular to each other. A discharge cell 13 is formed at an intersection of the data electrode D and the display electrode 4. Rare gas that is at least one of helium (He), neon (Ne), argon (Ar), and xenon (Xe) is sealed as discharge gas into the discharge cell 13. The red, green, and blue fluorescent layers 12 respectively cause the discharge cells 13 to emit light in red, green, and blue.

Then, FIG. 18 is a diagram of an arrangement of electrodes in the PDP. As shown in FIG. 18, M scanning electrodes $SCN_1$ to $SCN_M$ and M sustain electrodes $SUS_1$ to $SUS_M$ are arranged in a horizontal direction, and N data electrodes $D_1$ to $D_N$ are arranged in a vertical direction. M and N are respectively arbitrary natural numbers.

As an example of gray scale expression driving method for the PDP, an ADS (Address Display-Period Separation) system will be then described. FIG. 19 is a diagram for explaining the ADS system. In the ADS system, one field (1/60 seconds or 1/50 seconds) is divided into a plurality of sub-fields on a time basis. In an example shown in FIG. 19, one field is composed of eight sub-fields.

Each of the first to eighth sub-fields comprises an initialization period T1, a writing period T2, a sustain period T3, and an erasure period T4

In the initialization period T1, an initial setup pulse Pset is simultaneously applied to all the scanning electrodes $SCN_1$ to $SCN_M$. Thereafter, in the address period T2, a write pulse Pw is sequentially applied to the scanning electrodes $SCN_1$ to $SCN_M$ and a data pulse Pda is applied to the selected data electrodes $D_1$ to $D_N$ in synchronization with the write pulse Pw. Thus, sequential address discharges are induced in the selected discharge cell 13.

Then, in the sustain period T3, a sustain pulse Psc is applied to all the scanning electrodes $SCN_1$ to $SCN_M$ and a sustain pulse Psu is applied to all the sustain electrodes $SUS_1$ to $SUS_M$. The phase of the sustain pulse Psu is shifted by 180° from the phase of the sustain pulse Psc. Thus, sustain discharges are induced in the discharge cell 13 that has been subjected to address discharges in the address period T2.

Thereafter, in the erasure period T4, an erasure pulse Pe is applied to all the sustain electrodes $SUS_1$ to $SUS_M$. Thus, erasure discharges are induced in the discharge cell 13 that has been subjected to sustain discharges in the sustain period T3, so that the sustain discharges are stopped.

The operation is performed over all the sub-fields. Here, the respective numbers of sustain pulses Psu and Psc differ depending on the sub-field. The luminance of the discharge cell 13 displayed in each of the sub-fields is determined by the respective numbers of the sustain pulses Psu and Psc. Consequently, gray scale expression can be made by appropriately setting the respective numbers of sustain pulses Psu and Psc in each of the sub-fields.

[Patent Document] JP 2807672 B

DISCLOSURE OF THE INVENTION

Problems to be Solved by the Invention

In a case where an operation of lighting up a PDP is controlled by the above-mentioned driving method in a plasma display device having a configuration as disclosed in Patent Document 1, however, noise may be mixed with a voice outputted from a speaker.

Means for Solving the Problems

An object of the present invention is to provide a plasma display device capable of preventing noise from being mixed.

A plasma display device according to an aspect of the present invention is a plasma display device to which a voice output device having a voice coil can be connected, including a signal output unit that outputs a video signal and a voice signal, a plasma display panel on which a video is displayed by a plurality of discharge cells on the basis of the video signal outputted from the signal output unit, a voice circuit that supplies a voice current to the voice coil in the voice output device on the basis of the voice signal outputted from the signal output unit, and a first removal circuit that removes a current induced in the voice circuit due to a discharge current in the plasma display panel.

In the plasma display device, the video is displayed by the plurality of discharge cells in the plasma display panel on the basis of the video signal outputted from the signal output unit. The voice circuit supplies the voice current so the voice coil in the voice output device on the basis of the voice signal outputted from the signal output unit. Thus, the voice is outputted in the voice output device.

Here, the current induced in the voice circuit due to the discharge current in the plasma display panel is removed by the first removal circuit. Consequently, the current induced in the a voice circuit can be prevented from being supplied to the voice coil in the voice output device. Thus, the current induced in the voice circuit is prevented from being integrated by an integration circuit comprising an inductance of the voice coil and a resistive component in the voice output device. As a result, noise can be prevented from being outputted from the voice output device.

Each of the plurality of discharge cells may have first and second electrodes, the plasma display device may further include a conductive substrate that holds the plasma display panel, and first and second driving circuits that alternately apply a driving pulse for maintaining discharges in the discharge cells to the first and second electrodes, the first and second driving circuits may be electrically connected to each other through the conductive substrate, and the voice circuit may be arranged on the conductive substrate.

In this case, the driving pulse is alternately applied to the first and second electrodes, respectively, by the first and second driving circuits. Thus, the discharges in the discharge cells are maintained. At this time, the discharge current flows. The first and second driving circuits are electrically connected to each other through the conductive substrate. This allows the discharge current to be returned from the first driving circuit so the second driving circuit or from the second driving circuit to the first driving circuit through the conductive substrate.

Here, impedances in a path of the current from the first driving circuit to the second driving circuit and a path of the current from the second driving circuit to the first driving circuit can be reduced by sufficiently increasing the area of the conductive substrate. Consequently, a potential difference between the first driving circuit and the second driving circuit can be reduced. As a result, the first and second driving circuits can be prevented from being erroneously operated.

Even if the voice circuit is arranged on the conductive substrate, the current induced in the voice circuit due to the discharge current is removed by the first removal circuit. Consequently, the necessity of providing the voice circuit at a position spaced apart from the conductive substrate is eliminated, which allows the plasma display device to be thinned.

The first removal circuit may remove a current having the same frequency as that of the discharge current. The induced current caused by a magnetic field that changes at the same frequency as that of the discharge current is generated in the voice circuit. Consequently, the current having the same frequency as that of the discharge current is removed in the first removal circuit, so that the current induced in the voice circuit can be reliably removed. This can reliably prevent noise from being outputted from the voice output device.

The first removal circuit may include a bypass circuit through which the current induced in the voice circuit due to the discharge current flows. In this case, the current induced in the voice circuit due to the discharge current flows in the bypass circuit so that the current induced in the voice circuit is removed. Consequently, the current induced in the voice circuit can be reliably prevented from being supplied to the voice coil in the voice output device. As a result, noise can be reliably prevented from being outputted from the voice output device.

The voice circuit may further include a voice signal amplifier, and a first interconnection portion that electrically connects the voice signal amplifier and the voice coil in the voice output device to each other, the voice signal amplifier may amplify the voice signal outputted from the signal output unit and supply the voice current to the voice coil through the first interconnection portion, and the first removal circuit may be connected to the first interconnection portion.

In this case, the current induced in the voice circuit due to the discharge current is removed on the output side of the voice signal amplifier, so that the current induced in the voice circuit is reliably prevented from being supplied to the voice coil.

The plasma display device may further include a second removal circuit that removes the current induced in the voice circuit due to the discharge current in the plasma display panel, wherein the voice circuit may further include a second interconnection portion that electrically connects the signal output unit and the voice signal amplifier, and the second removal circuit may be connected to the second interconnection portion.

In this case, the current induced in the voice circuit is removed before being amplified by the voice signal amplifier. Thus, the current induced in the voice circuit due to the discharge current can be reliably removed on the input side and the output side of the voice signal amplifier.

The first removal circuit may include a capacitive element. In this case, a capacitive component and an equivalent series inductance of the capacitive element resonate at a predetermined frequency. Consequently, the capacitance value of the capacitive element is selected such that the resonance frequency of the capacitive component and the equivalent series inductance of the capacitive element and the frequency of the current induced in the voice circuit due to the discharge current are made equal to each other so that the current induced in the voice circuit can be reliably removed.

The first removal circuit may include a capacitive element and an inductive element that are connected in series with each other.

In this case, the impedance of the first removal circuit is lowered in a narrow band. Consequently, only the current having a desired frequency can be removed by selecting the capacitance value of the capacitive element and the inductance value of the inductive element. Thus, the current induced in the voice circuit due to the discharge current can be reliably removed.

The first removal circuit may include a capacitive element and a resistive element that are connected in series with each other.

In this case, the series resonance of the capacitive component and the equivalent series inductance of the capacitive element can be restrained in the first removal circuit. Thus, the current flowing in the first removal circuit can be restrained, so that power consumption in the voice circuit can be reduced.

The conductive substrate may include aluminum. In this case, the plasma display device can be made lightweight, and the manufacturing cost thereof can be reduced.

Effects of the Invention

According to the present invention, the current induced in the voice circuit can be prevented from being supplied to the voice coil in the voice output device. Thus, the current induced in the voice circuit can be prevented from being integrated by an integration circuit comprising an inductance of the voice coil and a resistive component in the voice output device. As a result, noise can be prevented from being outputted from the voice output device.

BRIEF DESCRIPTION OF THE DRAWINGS

FIG. 13 is a diagram showing frequency characteristics of the impedance of a high-frequency bypass unit.

FIG. 14 is a diagram showing another example of a high-frequency bypass unit.

BEST MODE FOR CARRYING OUT THE INVENTION

The embodiment below describes an AC plasma display device as an example of a plasma display device according to the present invention.

Figure 1:
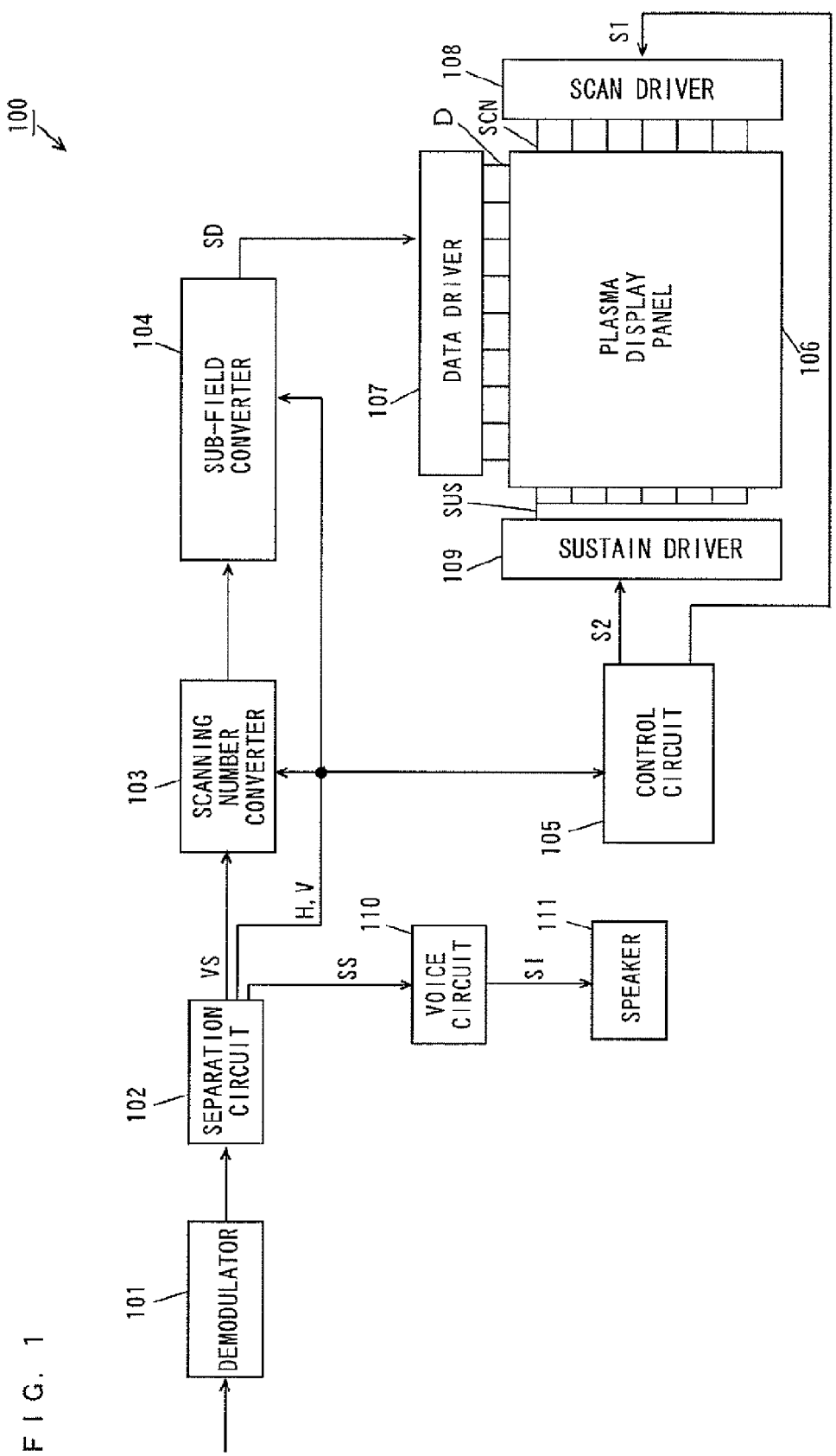
FIG. 1 is a block diagram showing the configuration of a plasma display device according to an embodiment of the present invention.

FIG. 1 is a block diagram showing the configuration of a plasma display device according to an embodiment of the present invention.

As shown in FIG. 1, a plasma display device 100 comprises a demodulator 101, a separation circuit 102, a scanning number converter 103, a sub-field converter 104, a control circuit 105, a plasma display panel (hereinafter abbreviated as a PDP) 106, a data driver 107, a scan driver 108, a sustain driver 109, a voice circuit 110, and a speaker 111. Usable as the PDP 106 is the plasma display panel described in FIGS. 15 to 18.

The decoder 101 decodes a television broadcasting signal. The separation circuit 102 separates the television broadcasting signal decoded by the demodulator 101 into a video signal VS, a horizontal synchronizing signal H, a vertical synchronizing signal V, and a voice signal SS.

The video signal VS is fed to the scanning number converter 103. The horizontal synchronizing signal H and the vertical synchronizing signal V are fed to the scanning number converter 103, the sub-field converter 104, and the control circuit 105.

The scanning number converter 103 converts the video signal VS into video data for lines whose number corresponds to the number of pixels in the PDP 106, and feeds the video data for each of the lines to the sub-field converter 104. The video data for each of the lines is composed of a plurality of pixel data respectively corresponding to the plurality of pixels composing the line.

The sub-field converter 104 converts each of the pixel data composing the video data for each of the lines into serial data SD corresponding so a plurality of sub-fields, and feeds the serial data SD to the data driver 107.

The control circuit 105 generates discharge control timing signals S1 and S2 on the basis of the horizontal synchronizing signal H and the vertical synchronizing signal V. The control circuit 105 feeds the discharge control timing signal S1 to the scan driver 108, and feeds the discharge control timing signal S2 to the sustain driver 109.

The PDP 106 comprises a plurality of data electrodes D, a plurality of scanning electrodes SCN, and a plurality of sustain electrodes SUS. The plurality of data electrodes D are arranged in the vertical direction of a screen, and the plurality of scanning electrodes SCN and the plurality of sustain electrodes SUS are arranged in the horizontal direction of the screen. The plurality of sustain electrodes SUS are connected to one another.

The discharge cells 13 (see FIG. 17) are respectively formed at intersections of the data electrodes D, the scanning electrode SCN, and the sustain electrodes SUS. Each of the discharge cells 13 constitutes the pixel on the screen.

The data driver 107 converts the serial data SD fed from the sub-field converter 104 into parallel data, and selectively applies write pulses to the plurality of data electrodes D on the basis of the parallel data.

The scan driver 108 drives the scanning electrodes SCN on the basis of the discharge control timing signal S1 fed from the control circuit 105. The sustain driver 109 drives the sustain electrodes SUS on the basis of the discharge control timing signal S2 fed from the control circuit 105. The PDP 106 can be driven by the method described in FIG. 19.

The voice circuit 110 applies a current SI based on the voice signal SS (hereinafter referred to as a voice current SI) to the speaker 111. Thus, a voice is outputted from the speaker 111.

Figure 2:
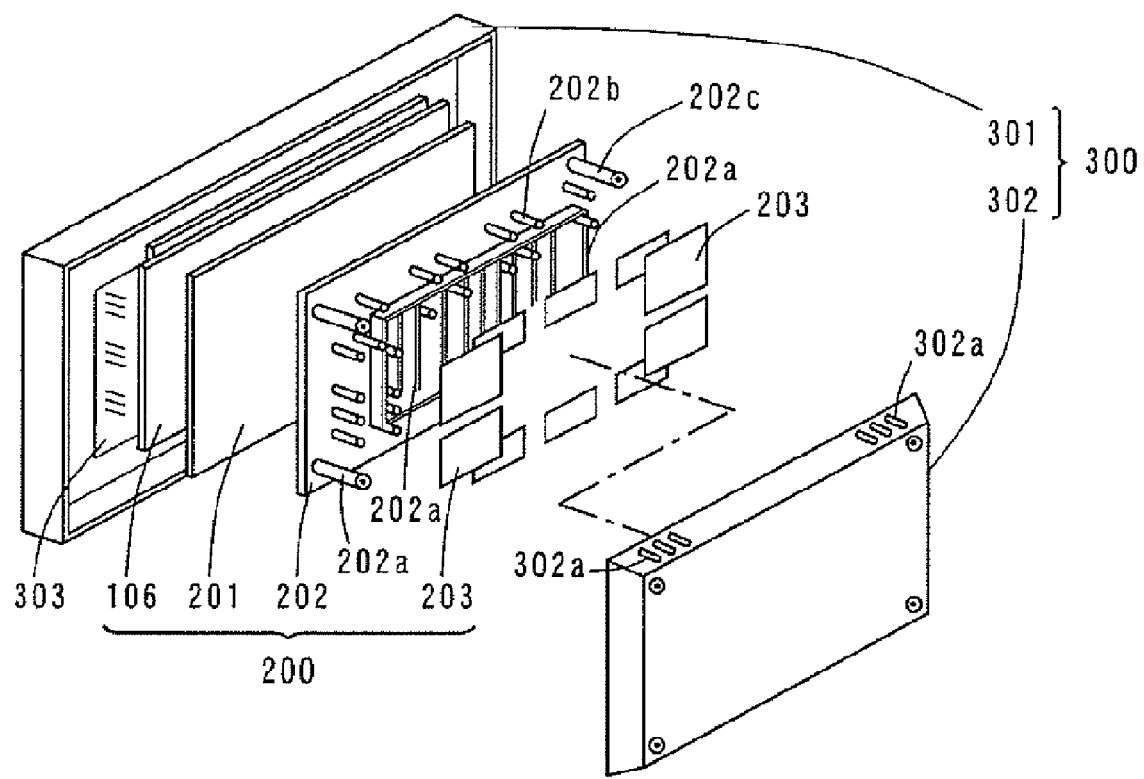
FIG. 2 is an exploded perspective view showing the plasma display device according to the present embodiment.

FIG. 2 is an exploded perspective view showing the plasma display device according to the present embodiment. In the following descriptions a surface on which a video of the plasma display device is displayed is taken as a front surface, and the opposite surface is taken as a rear surface.

As shown in FIG. 2, the plasma display device 100 has a main body 200, and a casing 300 for accommodating the main body 200.

The main body 200 comprises a PDP 106, a heat conduction sheet 201, a chassis member 202, and a plurality of circuit blocks 203.

The PDP 106 is made to adhere to a front surface of the chassis member 202 through the heat conduction sheet 201. The heat conduction sheet 201 is composed of insulating silicon, for example. The chassis member 202 is composed of aluminum, for example.

A plurality of heat radiating fins 202a, a plurality of bosses 202b, and a plurality of bosses 202c are integrally formed by casting such as die casting on a rear surface of the chassis member 202.

Heat generated by the PDP 106 is efficiently transferred to the chassis member 202 by the heat conduction sheet 201, and is radiated by the heat radiating fins 202a of the chassis member 202.

A circuit block 203 is supported on the rear surface of the chassis member 202 by the plurality of bosses 202b. The circuit block 203 comprises the control circuit 105, the data driver 107, the scan driver 108, the sustain driver 109, and the voice circuit 110, described in FIG. 1, and a power circuit 203a, described later.

The casing 300 comprises a front case 301 and a back case 302. The front case 301 and the back case 302 are composed of a metal, for example.

A translucent member 303 composed of glass or the like is provided on a front surface of the front case 301. A plurality of ventilation holes 302a for radiating heat generated in the main body 200 outward are provided in the top and the bottom of the back case 302 (only the top is illustrated).

The back case 302 is attached to the rear side of the chassis member 202 by the plurality of bosses 202c. The front case 301 is attached to the back case 302 by a machine screw (not shown).

Figure 3:
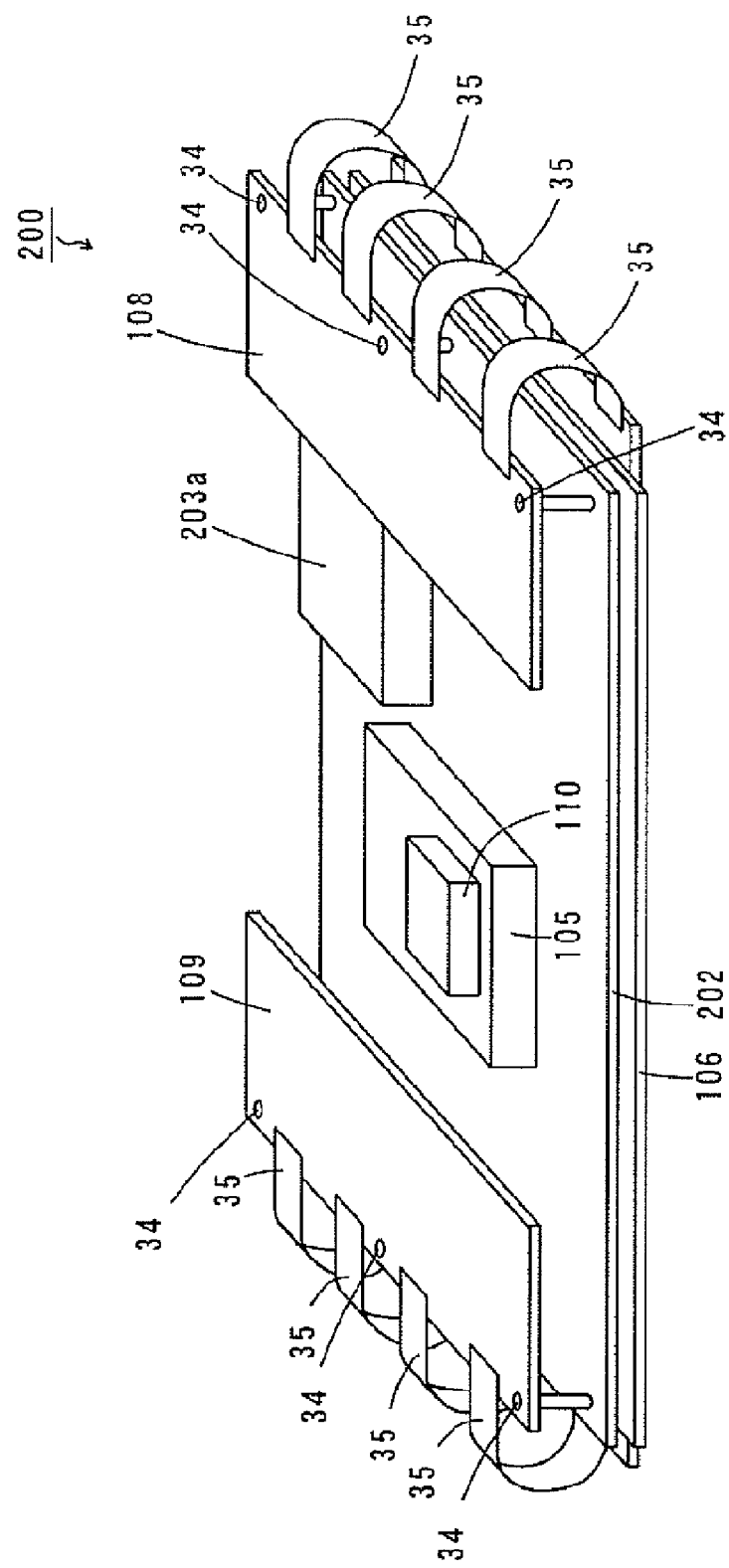
FIG. 3 is a perspective view showing the appearance of a main body as viewed from its rear surface.

FIG. 3 is a perspective view showing the appearance of the main body 200 as viewed from its rear surface.

As shown in FIG. 3, the control circuit 105 and the power supply circuit 203a for supplying power to each of the units are provided on the chassis member 202. The voice circuit 120 is provided on the control circuit 105.

The scan driver 108 is attached to one end of the chassis member 202 by a plurality of conductive supporting members 34 each composed of a machine screw or the like. The scan driver 108 is connected to the scanning electrodes SCN (see FIG. 1) in the PDP 106 through a plurality of flexible connection substrates 35.

The sustain driver 109 is attached to the other end of the chassis member 202 by the plurality of conductive supporting members 34. The sustain driver 109 is connected to the sustain electrodes SUS (see FIG. 1) in the POP 106 through the plurality of flexible connection substrates 35.

The control circuit 105 is connected to the scan driver 108 and the sustain driver 109 by interconnections (not shown) and feeds the discharge control timing signal S1 (see FIG. 1) to the scan driver 108 and feeds the discharge control timing signal S2 (see FIG. 1) to the sustain driver 109.

The voice circuit 110 is connected to the speaker 111 (see FIG. 1) by an interconnection (not shown), and applies the voice current SI (see FIG. 1) to the speaker 111.

Figure 4:
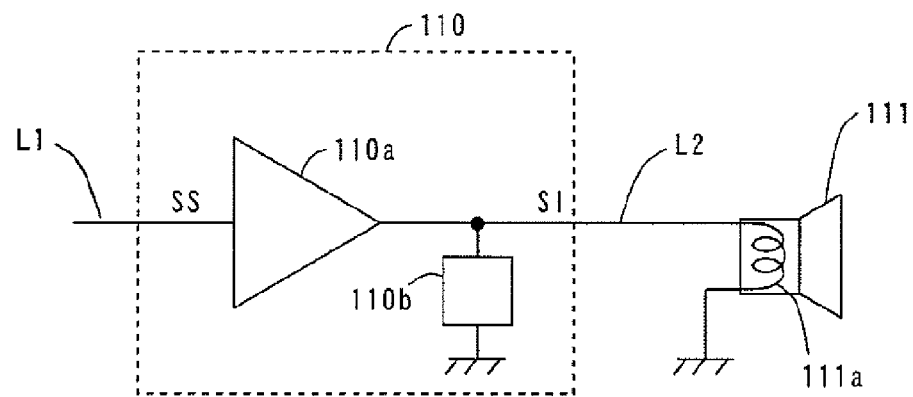
FIG. 4 is a circuit diagram of a voice circuit and a speaker.

FIG. 4 is a circuit diagram of the voice circuit 110 and the speaker 111. As shown in FIG. 4, the voice circuit 110 comprises a voice output amplifier 110a and a high-frequency bypass unit 110b. The speaker 111 comprises a voice coil 111a.

The voice signal SS is fed to an input terminal of the voice output amplifier 110a through an interconnection L1 from the separation circuit 102 (see FIG. 1). An output terminal of the voice output amplifier 110a is connected to one end of the voice coil 111a in the speaker 111 through an interconnection L2, and is grounded through the high-frequency bypass unit 110b. The other end of the voice coil 111a is grounded.

The voice output amplifier 110a amplifies the voice signal SS, and supplies a voice current SI obtained by the amplification to the voice coil 111a. Thus, a voice is outputted from the speaker 111.

As the high-frequency bypass unit 110b, a capacitive element, a series circuit of a capacitive element and an inductive element, or a series circuit of a capacitive element and a resistive element can be used. The high-frequency bypass unit 110b performs the function of removing a high-frequency induced current generated in the voice circuit 110. The details will be described later.

Description is herein made of a current applied to the speaker 111 from the voice circuit 110 in a case where the voice circuit 110 is not provided with the high-frequency bypass unit 110b.

Figure 19:
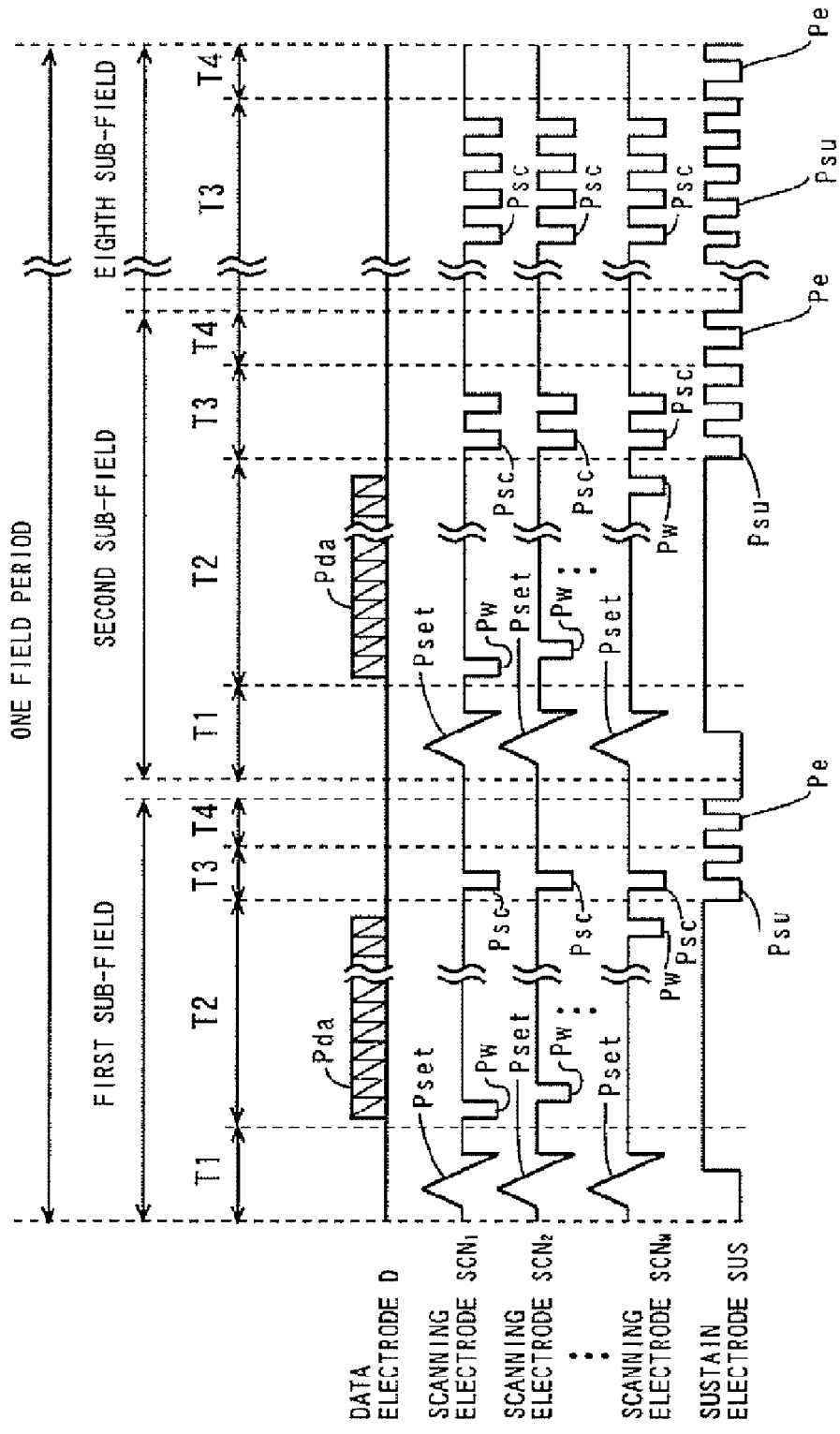
FIG. 19 is a diagram for explaining an ADS system.

As described in FIG. 19, in a case where the PDP 106 is driven, the sustain pulse Psc and the sustain pulse Psu are alternately applied to the scanning electrode SCN and the sustain electrode SUS in the sustain period T3. Thus, a discharge current caused by application of the sustain pulses Psc and Psu flows between the scanning electrode SCN and the sustain electrode SUS.

When the sustain pulse Psc is applied to the scanning electrode SCN in the PDP 106 by the scan driver 103, the discharge current in the PDP 106 flows in a path from a ground terminal of the sustain driver 109 to a ground terminal of the scan driver 108. When the sustain pulse Psu is applied to the sustain electrode SUS in the PDP 106 by the sustain driver 109, the discharge current in the PDP 106 flows in a path from the ground terminal of the scan driver 108 to the ground terminal of the sustain driver 109.

Here, assuming that a discharge current of approximately 0.4 [Ap-p] flows between the scanning electrode SCN and the sustain electrode SUS, for example, a discharge current of a total of 0.4 M [Ap-p] is generated in the M scanning electrodes SCN and the M sustain electrodes SUS. In a case where the respective numbers of scanning electrodes SCN and sustain electrodes SUS are 480, a total of discharge currents becomes as large as 192[Ap-p].

In a case where the discharge current is thus large, when the impedance of the current path between the ground terminal of the scan driver 108 and the ground terminal of the sustain driver 109 is large, a large potential difference occurs between the ground terminal of the scan driver 108 and the ground terminal of the sustain driver 109. Thus, the scan driver 108 and the sustain driver 109 may not, in some cases, be normally operated.

In the present embodiment, therefore, the discharge current is caused to flow through the chassis member 202 between the ground terminal of the scan driver 108 and the ground terminal of the sustain driver 109 in order to reduce the impedance of the current path between the ground terminal of the scan driver 108 and the ground terminal of the sustain driver 109.

Figure 5:
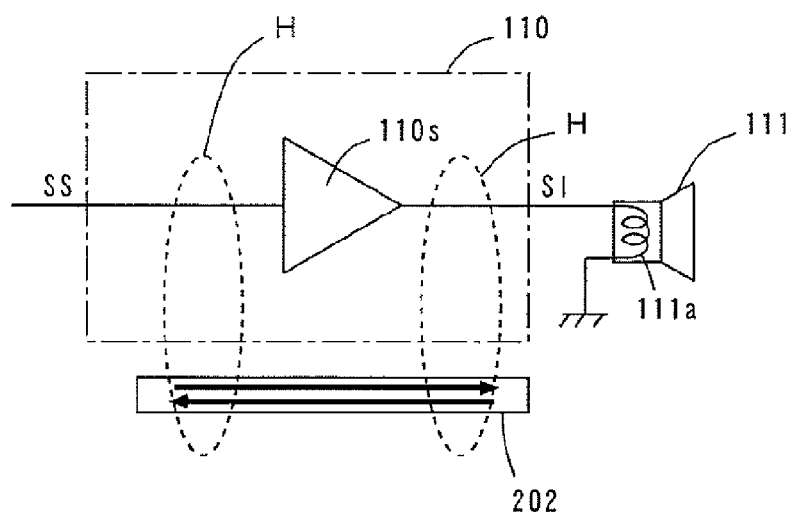
FIG. 5 is a diagram for explaining the effect of a magnetic field generated by a discharge current flowing in a chassis member on a voice circuit.

When the above-mentioned large discharge current flows in the chassis member 202, however, a large magnetic field is generated by the discharge current. FIG. 5 is a diagram for explaining the effect of the magnetic field generated by the discharge current flowing in the chassis member 202 on the voice circuit 110.

In FIG. 5, the discharge current flowing in the chassis member 202 is indicated by two arrows. One of the two arrows indicates the discharge current flowing from the ground terminal of the scan driver 108 to the ground terminal of the sustain driver 109, and the other arrow indicates the discharge current flowing from the ground terminal of the sustain driver 109 to the ground terminal of the scan driver 108.

As shown in FIG. 5, when the discharge current flows in the chassis member 202, a magnetic field H that changes at the same frequency as that of the discharge current is generated. As shown in FIG. 3, the voice circuit 110 is provided on the chassis member 202 through the control circuit 105. In this case, an induced current having the same frequency as that of the discharge current (hereinafter referred to as a high-frequency induced current) is generated in the voice circuit 110.

The high frequency induced current generated in the voice circuit 110 is superimposed on the voice current SI. The high-frequency induced current, together with the voice current SI, is supplied to the voice coil 111a in the speaker 111. At this time, the high-frequency induced current supplied to the voice coil 111a is integrated in one field period by an integration circuit comprising an inductance of the voice coil 111a and a resistive component. In this case, one field period is 1/60 seconds or 1/50 seconds, so that the integrated high-frequency induced current has a serrated current waveform that is repeated in the period of 1/60 seconds or 1/50 seconds. A current obtained by integrating the high-frequency induced current is hereinafter referred to as a low-frequency noise current. The inventor of the present invention has simulated this phenomenon in the following manner.

Figure 6:
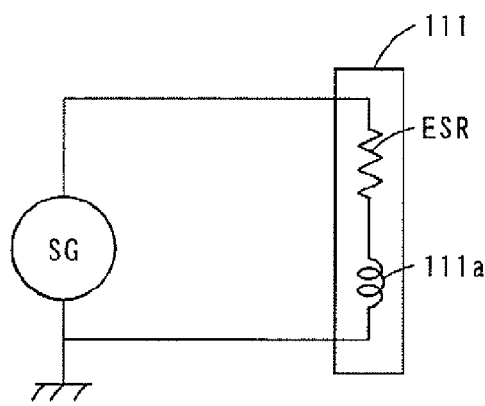
FIG. 6 is an equivalent circuit diagram of a simulation circuit.

FIG. 6 is an equivalent circuit diagram of a simulation circuit. As shown in FIG. 6, a signal generator SG is connected to both ends of the speaker 111 as a generation source of the high-frequency induced current. The speaker 111 comprises an equivalent series resistance ESR and a voice coil 111a.

Figure 7:
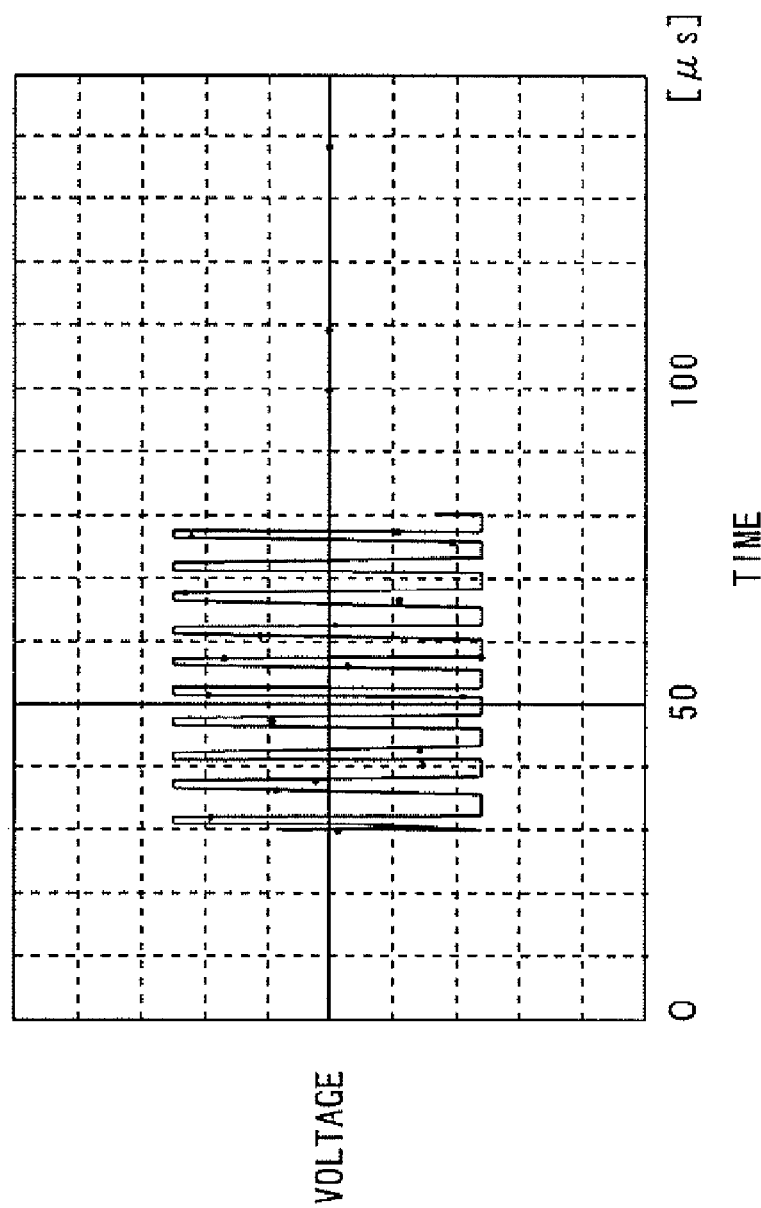
FIG. 7 is a diagram showing a voltage waveform generated by a signal generator.
Figure 8:
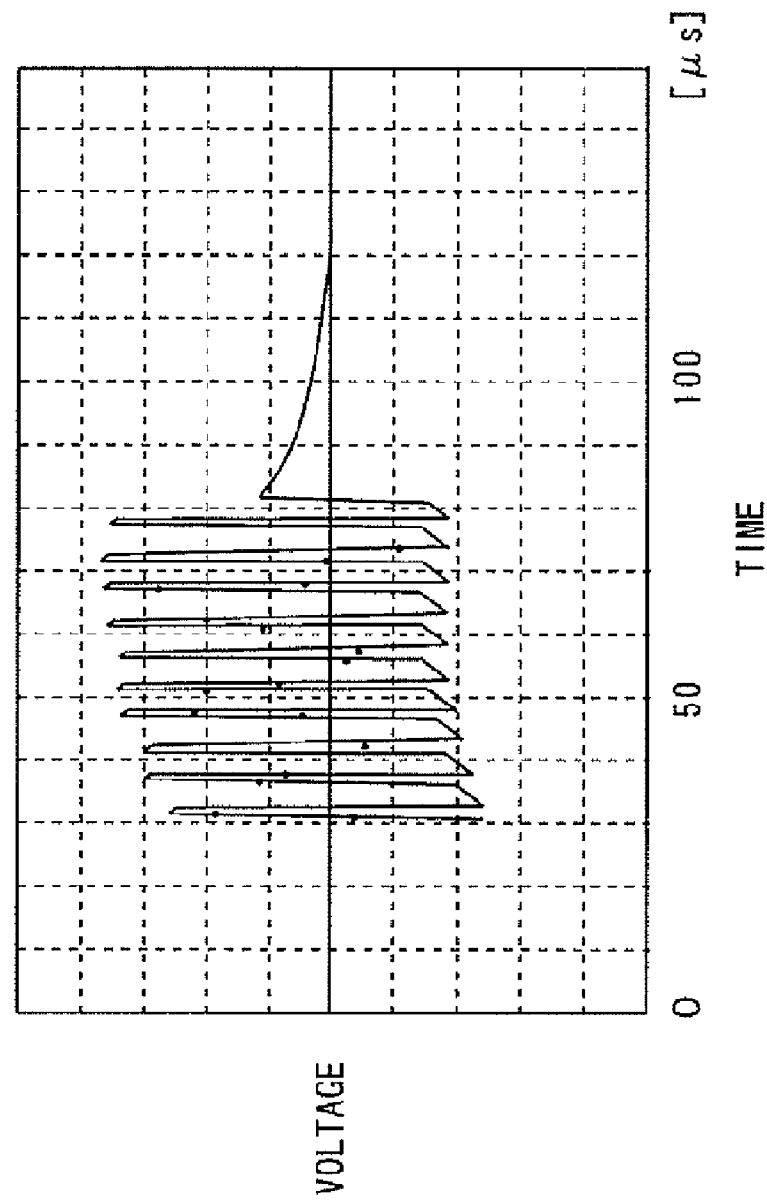
FIG. 8 is a diagram showing a voltage waveform at both ends of a voice coil in a simulation circuit.
Figure 9:
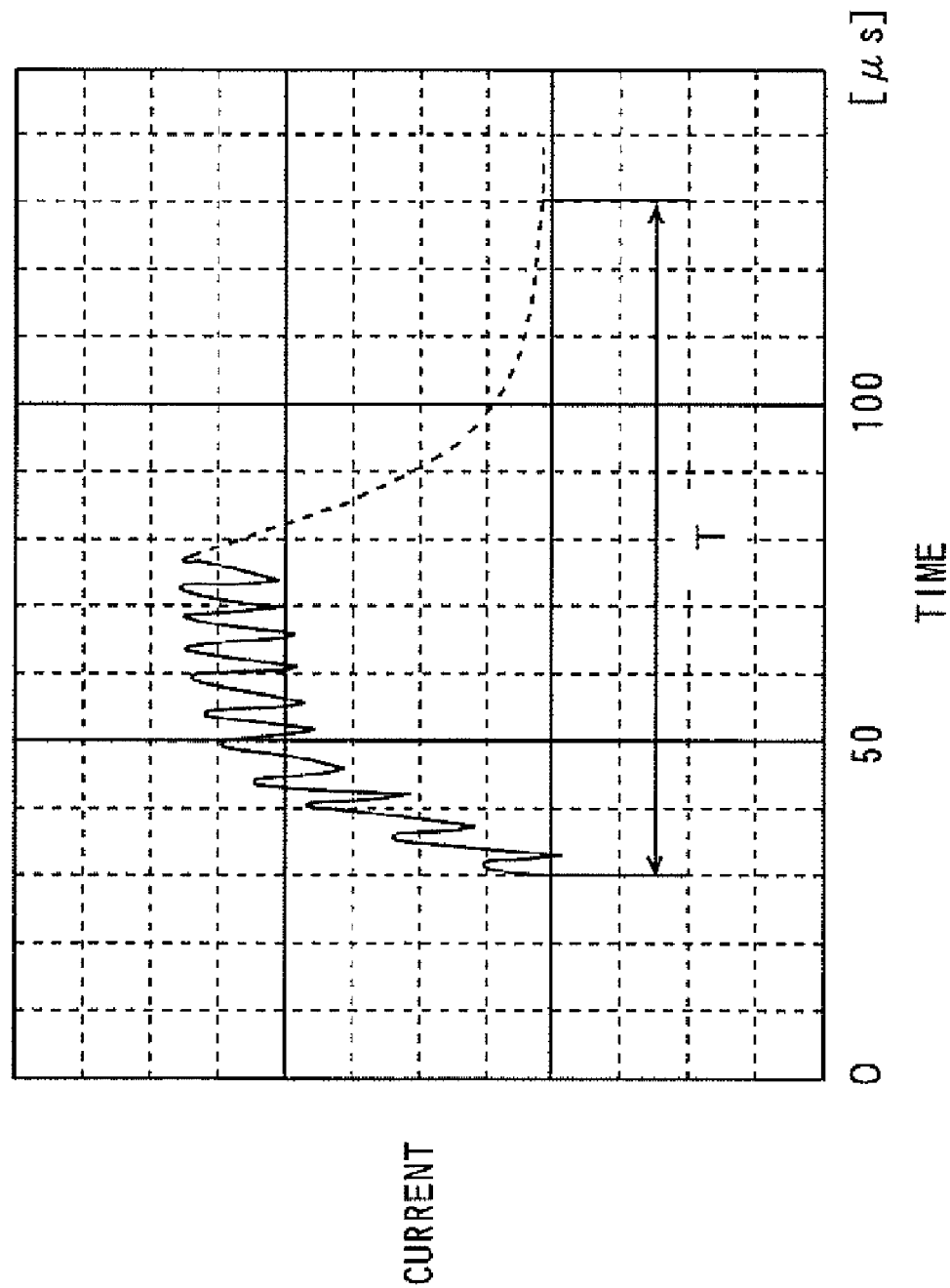
FIG. 9 is a diagram showing a voltage waveform in a voice coil.

FIG. 7 shows a voltage waveform generated by the signal generator SG in the simulation circuit, FIG. 8 shows a voltage waveform at both ends of the voice coil 111a in the simulation circuit, and FIG. 9 shows a current waveform of the voice coil 111a in the simulation circuit.

In FIGS. 7 and 8, the horizontal axis indicates time, and the vertical axis indicates a voltage. In FIG. 9, the horizontal axis indicates time, and the vertical axis indicates a current.

As shown in FIG. 7, a burst-shaped voltage having a frequency of approximately 200 kHz is generated from the signal generator SG. As shown in FIG. 8, a burst-shaped voltage is applied to both the ends of the voice coil 111a depending on a voltage generated from the signal generator SG.

A current having a frequency of approximately 200 kHz flows in the voice coil 111a depending an the voltage generated from the signal generator SG. This current is integrated by an integration circuit comprising the equivalent series resistance ESR and the voice coil 111a in the speaker 111. Thus, the current flowing in the voice coil 111a increases after the voltage is applied by the signal generator SG and decreases after the application of the voltage by the signal generator SG is terminated.

In this case, the frequency (approximately 200 kHz) of the current flowing depending on the burst-shaped voltage of the signal generator SG deviates from an audible frequency, so that the frequency of the current is not outputted as noise from the speaker 111.

However, a period T (see FIG. 9) of an envelope of the current integrated in the voice coil 111a is approximately 100 μs, and the frequency of the current flowing in the voice coil 111a is approximately 10 kHz. In this case, the frequency is the audible frequency and therefore, it is outputted as noise from the speaker 111.

Figure 10:
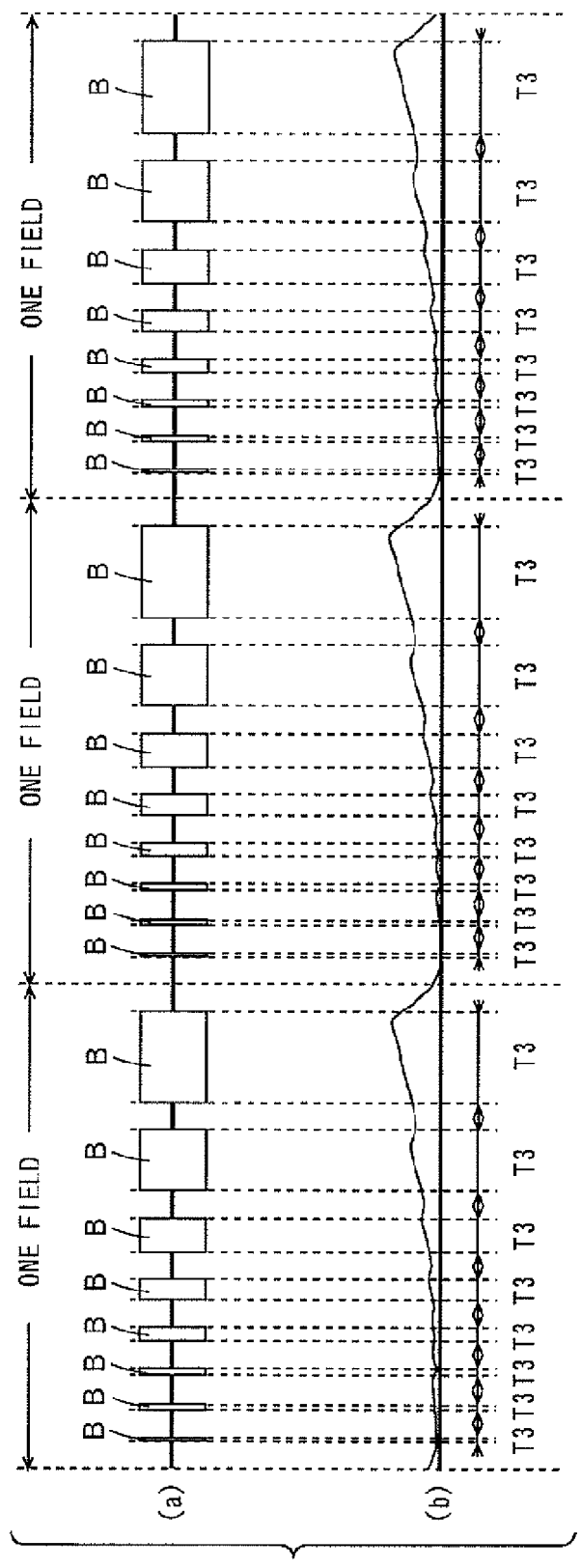
FIG. 10 is a diagram showing the relationship between a discharge current flowing in a chassis member and a low-frequency noise current flowing in a voice coil in a case where a plasma display device is driven in an ADS system.

Here, consider the above-mentioned phenomenon in the plasma display device again. FIG. 10 is a diagram showing the relationship between a discharge current flowing in the chassis member 202 and a low-frequency noise current flowing in the voice coil 111a in a case where the plasma display device is driven in an ADS system. FIG. 10(a) indicates the discharge current, and FIG. 10(b) indicates the low-frequency noise current. In FIG. 10(a), a time period (a sustain period T3) during which a discharge current flows is indicated by a square B for simplification. However, a pulse-shaped discharge current actually flows depending on the sustain pulses Psc and Psu, as described above.

The high-frequency induced current in the voice circuit 110 is generated when the discharge current flows in the chassis member 202, as described in FIG. 5. Consequently, the high-frequency induced current is integrated in the sustain period T3 in each of sub-fields, so that the low-frequency noise current gradually increases, as shown in FIG. 10. After the sustain period T3 in the last sub-field is terminated, the low-frequency noise current gradually decreases. Thereafter, in the sustain period T3 in the first sub-field in the subsequent field, the integration of the high-frequency induced current is started again, so that the low-frequency noise current gradually increases. After the sustain period T3 in the last sub-field is terminated, the low-frequency noise current gradually decreases. The increase and the decrease of the low-frequency noise current are repeated for each field.

Figure 11:
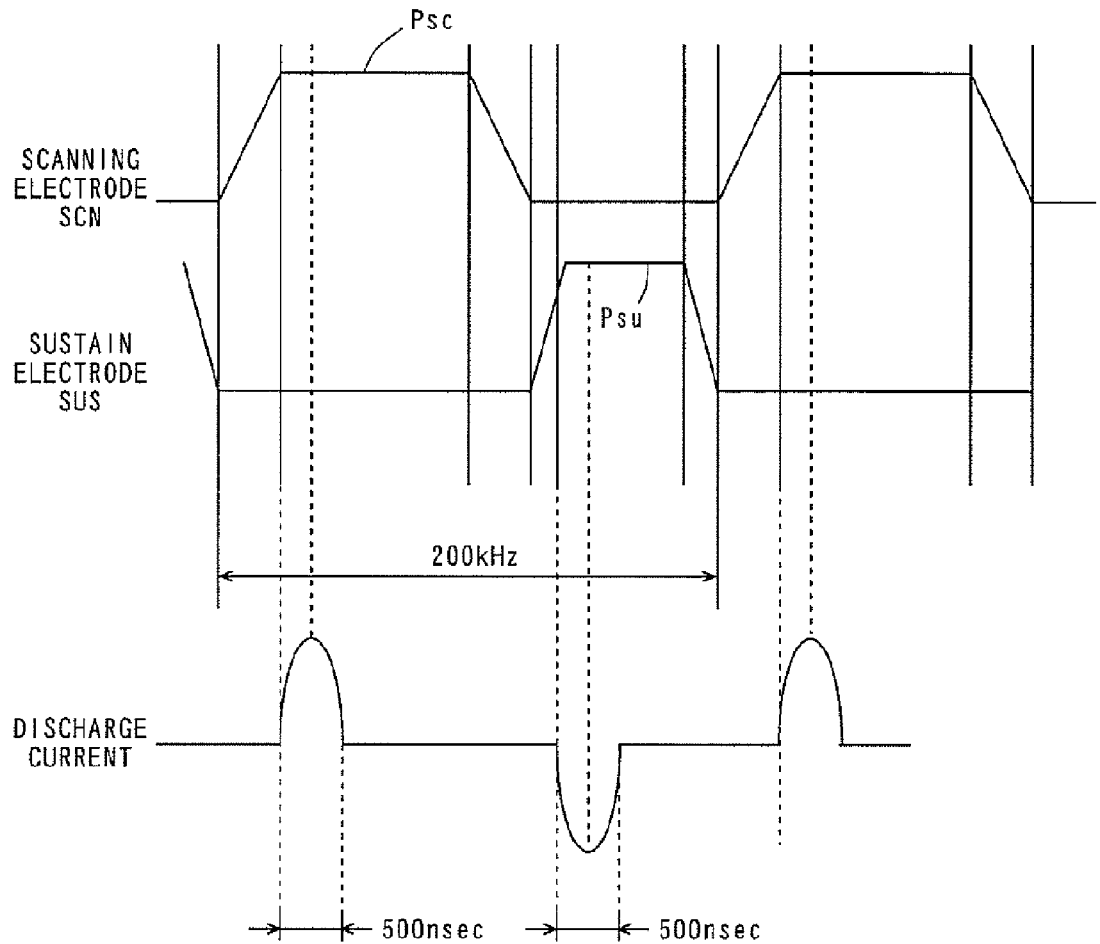
FIG. 11 is a diagram showing the relationship between a sustain pulse applied to one scanning electrode and one sustain electrode in a sustain period and a discharge current flowing between the scanning electrode and the sustain electrode.

Here, the discharge current generated in the sustain period T3 will be described in detail. FIG. 11 is a diagram showing the relationship between sustain pulses Psc and Psu respectively applied to the one scanning electrode SCN and the one sustain electrode SUS in the sustain period T3 and the discharge current flowing between the scanning electrode SCN and the sustain electrode SUS.

In a case where the sustain pulses Psc and Psu having a frequency of 200 kHz are applied in the sustain period T3, for example, as shown in FIG. 11, the discharge current flows between the scanning electrode SCN and the sustain electrode SUS once as each of the rise time of the sustain pulse Psc and the rise time of the sustain pulse Psu. The discharge current flows during approximately 500 nsec, as shown in FIG. 11. In this case, the frequency of the discharge current per one discharge is approximately 1 MHz. Thus, a pulse-shaped discharge current having a frequency of approximately 1 MHz flows in the chassis member 202 in each discharge.

In this case, the high-frequency induced current is generated in the voice circuit 110 due to the discharge current, as described above. Therefore, a high frequency induced current (a current having a frequency of approximately 1 MHz in this example) is applied to the voice coil 111a in the same period as the period of the sustain pulses Psc and Psu. However, the frequency (1 MHz) of the high-frequency induced current deviates from the audible frequency and therefore, it is not outputted as noise from the speaker 111.

On the other hand, the period of the low-frequency noise current flowing in the voice coil 111a corresponds to one field period, so that it is 1/60 seconds or 1/50 seconds. In this case, the frequency of the low-frequency noise current is the audible frequency and therefore, it is outputted as noise from the speaker 111.

In the present embodiment, therefore, the high-frequency bypass unit 110b is provided between the interconnection L2 connected to an output terminal of the voice output amplifier 110a and a ground terminal in the voice circuit 110 (see FIG. 4) in order to remove the low-frequency noise current. As described in the foregoing, a capacitive element, a series circuit of a capacitive element and an inductive element, or a series circuit of a capacitive element and a resistive element can be used as the high-frequency bypass unit 110b.

Figure 12:
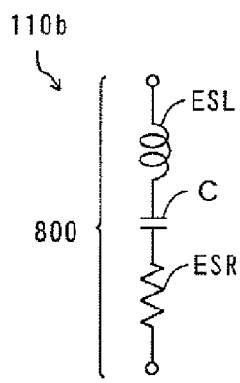
FIG. 12a is an equivalent circuit diagram in a case where a capacitive element is used as a high-frequency bypass unit.
FIG. 12b is an equivalent circuit diagram in a case where a series circuit of a capacitive element and an inductive element is used as a high-frequency bypass unit.
FIG. 12c is an equivalent circuit diagram in a case where a series circuit of a capacitive element and an resistive element is used as a high-frequency bypass unit.
Figure 12:
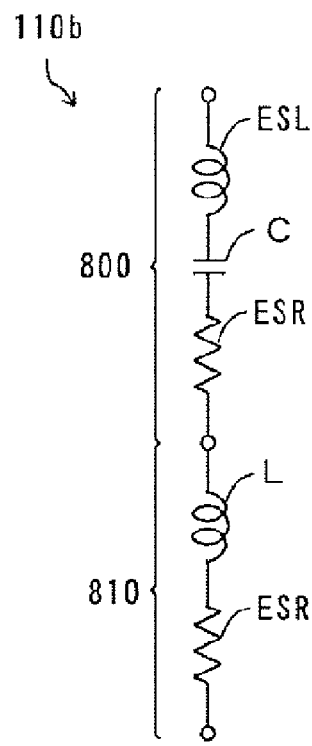
Figure 12:
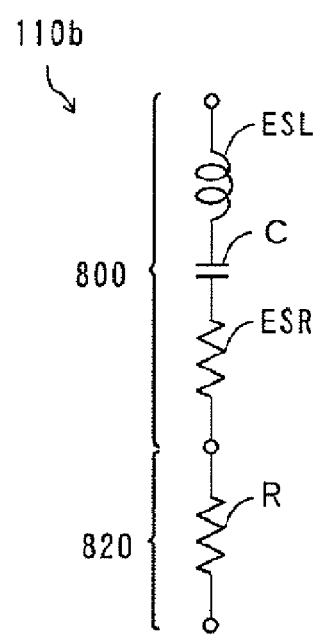
Figure 15:
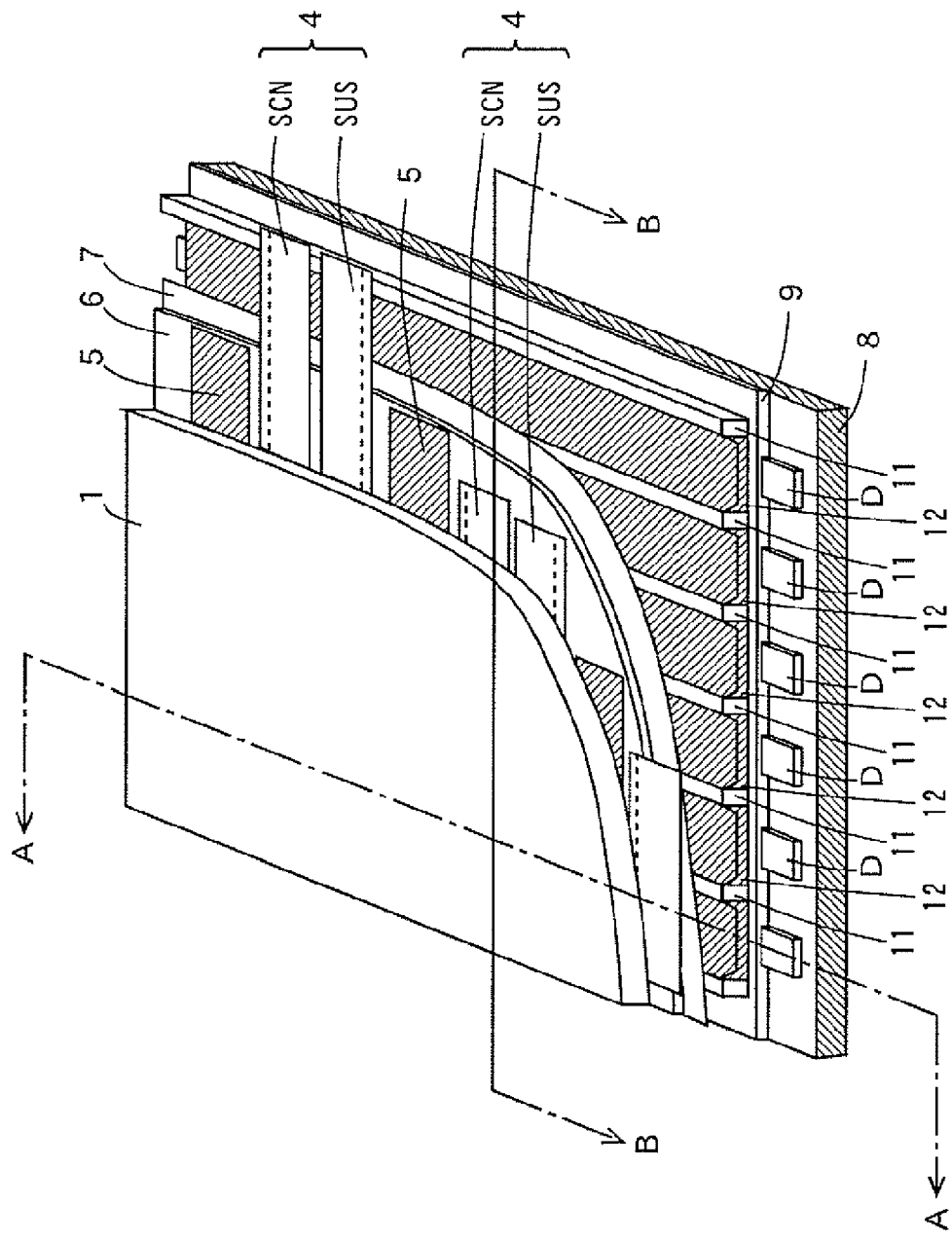
FIG. 15 is a perspective view showing a part of a conventional AC-type PDP.
Figure 16:
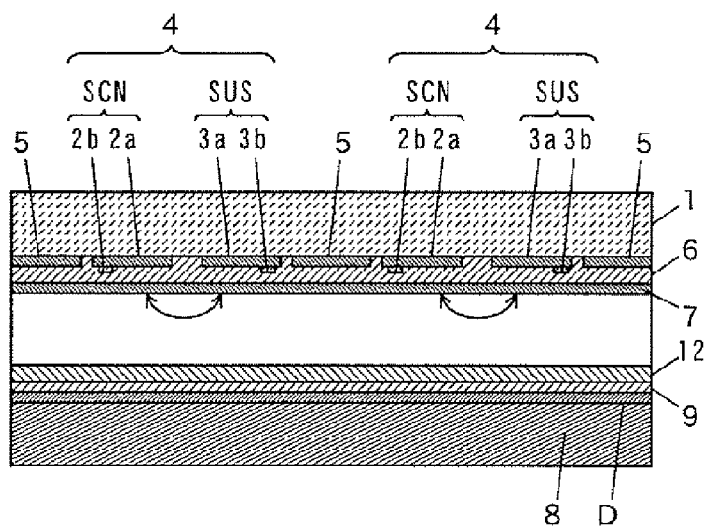
FIG. 16 is a cross-sectional view taken along a line A-A shown in FIG. 15.
Figure 17:
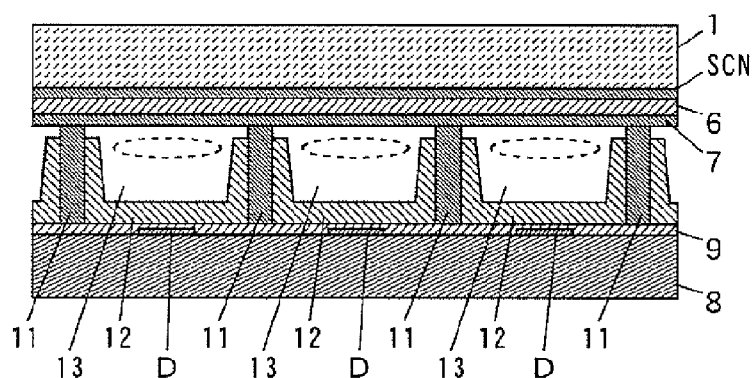
FIG. 17 is a cross-sectional view taken along a line B-B shown in FIG. 15.
Figure 18:
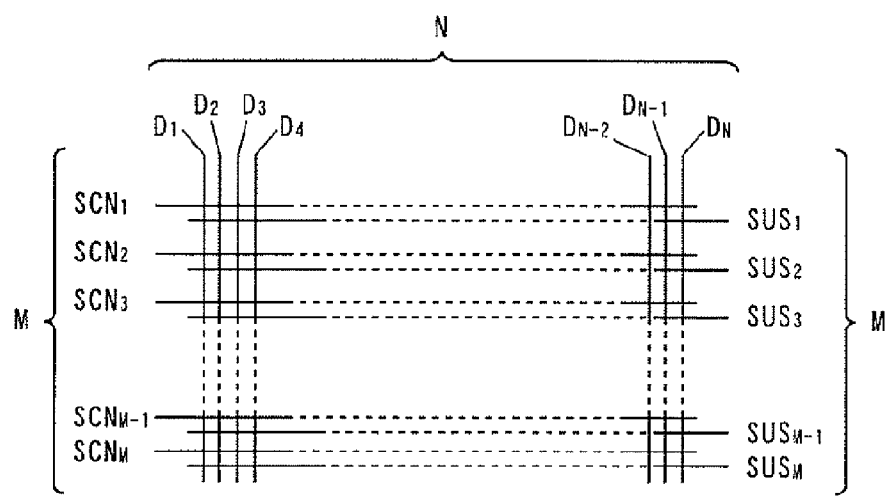
FIG. 18 is a diagram of an arrangement of electrodes in a PDP.

FIGS. 12a, 12b, and 12c are equivalent circuit diagrams of the high-frequency bypass unit 110b, and FIG. 13 is a diagram showing frequency characteristics of the impedance of the high-frequency bypass unit 110b. In FIG. 13, the horizontal axis indicates a frequency, and the vertical axis indicates an impedance.

In a case where a capacitive element 800 is used as the high-frequency bypass unit 110b, as shown in FIG. 12a, the high-frequency bypass unit 110b comprises an equivalent series inductance ESL, a capacitive component C, and an equivalent series resistance ESR. In this case, the equivalent series inductance ESL and the capacitive component C resonate at a predetermined frequency, so that the impedance of the high-frequency bypass unit 110b is reduced to a minimum at a resonance frequency, as indicated by a solid line in FIG. 13.

As described in the foregoing, the high-frequency induced current generated in the voice circuit 110 has the same frequency as the discharge current. Consequently, the capacitance value of the capacitive element is selected such that the resonance frequency of the high-frequency bypass unit 110b and the frequency of the discharge current become equal to each other, so that the high-frequency induced current generated in the voice circuit 110 can be caused to flow to the ground terminal through the high-frequency bypass unit 110b. Thus, the high-frequency induced current can be prevented from being integrated in the voice coil 111a in the speaker 111. Consequently, the low-frequency noise current having a period corresponding to one field period can be prevented from being generated. As a result, noise can be prevented from being outputted from the speaker 111.

In a case where a series circuit of a capacitive element 800 and an inductive element 810 is used as the high-frequency bypass unit 110b, as shown in FIG. 12b, the high-frequency bypass unit 110b comprises an equivalent series inductance ESL, a capacitive component C, an equivalent series resistance ESR, an inductance L, and an equivalent series resistance ESR. In this case, the impedance of the high-frequency bypass unit 110b is reduced to a minimum at a resonance frequency lower than that in a case where only the capacitive element 800 is used, as indicated by a dotted line in FIG. 13.

In a case where there is no capacitive element 800 having a suitable capacitance value for making the resonance frequency of the high-frequency bypass unit 110b and the frequency of the discharge current equal to each other, therefore, the inductive element 810 is connected in series so that the resonance frequency of the high-frequency bypass unit 110b can be set to the most suitable value.

In a case where a series circuit of a capacitive element 800 and an inductive element 810 is used as the high-frequency bypass unit 110b, the impedance is lowered in a narrow band, as shown in FIG. 13. Consequently, only the high-frequency induced current having a desired frequency, which is desired to be removed, can be reliably removed.

In a case where a series circuit of a capacitive element 800 and an inductive element 820 is used as the high-frequency bypass unit 110b, as shown in FIG. 12c, the high-frequency bypass unit 110b comprises an equivalent series inductance ESL, a capacitive component C, an equivalent series resistance ESR, and a resistive component R. In this case, series resonance can be more greatly restrained, as compared with that in a case where only the capacitive element C is used as the high-frequency bypass unit 110b, as indicated by a one-dot and dash line in FIG. 13. This can prevent the current flowing in the high-frequency bypass unit 110b from being restricted, so that power consumption in the voice circuit 110 can be reduced.

Here, in a case where the high-frequency induced current is generated on the side of an input terminal (on the side of the interconnection L1) of the voice output amplifier 110b in the voice circuit 110, for example, the high-frequency induced current is amplified by the voice output amplifier 110b. In this case, when all the amplified high-frequency induced currents are caused to flow to the ground terminal through the high-frequency bypass unit 110b, the power consumption is significantly increased. Consequently, in such a case, the power consumption in the voice circuit 110 can be prevented from being significantly increased by employing the above-mentioned configuration. In a case where the configuration is employed, the series resonance of the high-frequency bypass unit 110b is restrained so such a degree that noise, which can be heard by a user from the speaker 111, is not outputted.

The high-frequency bypass unit 110b may be further provided between the interconnection L1 connected to the input terminal of the voice output amplifier 110a and the ground terminal, as shown in FIG. 14. In this case, the high-frequency induced current can be reliably removed on the input side and the output side of the voice output amplifier 110a.

Although description was made of the configuration in which the speaker 111 is included in the plasma display device 100 in the above-mentioned embodiment, the speaker 111 may be connected to the plasma display device 100 as an external device.

(Correspondences between various elements recited in the claims below and those described above with respect to various preferred embodiments of the present invention)

In the above-mentioned embodiment, the speaker 111 corresponds to a voice output device, the separation circuit 102 corresponds to a signal output unit, and the high-frequency bypass unit 110b corresponds to first and second removal circuits.

The scanning electrodes SCN and the sustain electrode SUS correspond to first and second electrodes, the scan driver 108 and the sustain driver 109 correspond to first and second driving circuits, the sustain pulse Psc and the sustain pulse Psu correspond to a driving pulse, the chassis 202 corresponds to a conductive substrate, the high-frequency bypass unit 110b corresponds to a bypass circuit, the voice output amplifier 110a corresponds to a voice signal amplifier, the interconnection L2 corresponds to a first interconnection portion, and the interconnection L1 corresponds to a second interconnection portion.

INDUSTRIAL APPLICABILITY

The present invention is applicable for displaying various videos as well as outputting a voice, for example.

The invention claimed is:

1. A plasma display device to which a voice output device having a voice coil can be connected, comprising:
a signal output unit that outputs a video signal and a voice signal;
a plasma display panel on which a video is displayed by a plurality of discharge cells on the basis of the video signal outputted from said signal output unit;
a voice circuit that supplies a voice current to the voice coil in the voice output device on the basis of the voice signal outputted from said signal output unit; and
a first removal circuit that removes a current induced in said voice circuit due to a discharge current in said plasma display panel.

2. The plasma display device according to claim 1, wherein
each of said plurality of discharge cells has first and second electrodes, said plasma display device further comprising a conductive substrate that holds said plasma display panel, and first and second driving circuits that alternately apply a driving pulse for maintaining discharges in said discharge cells to said first and second electrodes, said first and second driving circuits being electrically connected to each other through said conductive substrate, and said voice circuit being arranged on said conductive substrate.

3. The plasma display device according to claim 2, wherein said first removal circuit removes a current having the same frequency as that of said discharge current.

4. The plasma display device according to claim 1, wherein said first removal circuit includes a bypass circuit through which the current induced in said voice circuit due to said discharge current flows.

5. The plasma display device according to claim 1, wherein said voice circuit further includes a voice signal amplifier, and a first interconnection portion that electrically connects said voice signal amplifier and said voice coil in said voice output device to each other, said voice signal amplifier amplifying the voice signal outputted from said signal output unit and supplying said voice current to said voice coil through the first interconnection portion, and said first removal circuit being connected to said first interconnection portion.

6. The plasma display device according to claim 5, further comprising a second removal circuit that removes the current induced in said voice circuit due to the discharge current in said plasma display panel, wherein said voice circuit further includes a second interconnection portion that electrically connects said signal output unit and said voice signal amplifier, and said second removal circuit is connected to said second interconnection portion.

7. The plasma display device according to claim 1, wherein said first removal circuit includes a capacitive element.

8. The plasma display device according to claim 1, wherein said first removal circuit includes a capacitive element and an inductive element that are connected in series with each other.

9. The plasma display device according to claim 1, wherein said first removal circuit includes a capacitive element and a resistive element that are connected in series with each other.

10. The plasma display device according to claim 2, wherein said conductive substrate includes aluminum.

* * * * *